(12) United States Patent
Suh et al.

(10) Patent No.: US 7,508,830 B1
(45) Date of Patent: Mar. 24, 2009

(54) METHOD AND APPARATUS DIFFERENTIAL DELAY COMPENSATION PROCESSING OF VIRTUALLY CONCATENATED DATA

(75) Inventors: Soowan Suh, San Ramon, CA (US); Jing Ling, Fremont, CA (US); Juan-Carlos Calderon, Fremont, CA (US); Jean-Michel Caia, San Francisco, CA (US); Rodrigo Gonzalez, Concord, CA (US)

(73) Assignee: Intel Corporation, Santa Clara, CA (US)

( * ) Notice: Subject to any disclaimer, the term of this patent is extended or adjusted under 35 U.S.C. 154(b) by 892 days.

(21) Appl. No.: 10/927,833

(22) Filed: Aug. 27, 2004

(51) Int. Cl.
*H04L 12/56* (2006.01)
(52) U.S. Cl. .................... 370/393; 370/412; 370/395.7
(58) Field of Classification Search .............. 370/395.7, 370/395.71, 395.72
See application file for complete search history.

(56) References Cited

U.S. PATENT DOCUMENTS

| 5,838,677 A * | 11/1998 | Kozaki et al. ............... 370/389 |
| 6,697,368 B2 * | 2/2004 | Chang et al. ............. 370/395.1 |
| 6,775,302 B1 * | 8/2004 | Shaffer et al. ............... 370/518 |
| 7,064,987 B2 * | 6/2006 | Lin ....................... 365/189.16 |
| 7,327,732 B2 * | 2/2008 | Erlenborn et al. ........... 370/392 |
| 2004/0081163 A1 * | 4/2004 | Lecha et al. ............. 370/395.7 |

\* cited by examiner

*Primary Examiner*—Wing F Chan
*Assistant Examiner*—Brian Roberts
(74) *Attorney, Agent, or Firm*—Blakely, Sokoloff, Taylor & Zafman LLP

(57) ABSTRACT

A method and apparatus for determining a read address for received data in a communications network employing virtually concatenated payloads is provided. The method and apparatus comprise determining a minimum write address using a plurality of memory elements and using the minimum write address in connection with received read addresses to determine group read addresses.

24 Claims, 7 Drawing Sheets

METHOD AND APPARATUS DIFFERENTIAL DELAY COMPENSATION PROCESSING OF VIRTUALLY CONCATENATED DATA

BACKGROUND OF THE INVENTION

1. Field of the Invention

The present invention relates generally to the field of high speed data transfer, and more specifically to managing virtually concatenated payload groups in specific data transfer architectures, such as SONET/SDH.

2. Description of the Related Art

Data communication networks receive and transmit ever increasing amounts of data. Data is transmitted from an originator or requestor through a network to a destination, such as a router, switching platform, other network, or application. Along this path may be multiple transfer points, such as hardware routers, that receive data typically in the form of packets or data frames. At each transfer point data must be routed to the next point in the network in a rapid and efficient manner.

Data transmission over fiber optics networks may conform to the SONET and/or SDH standards. SONET and SDH are a set of related standards for synchronous data transmission over fiber optic networks. SONET is short for Synchronous Optical NETwork and SDH is an acronym for Synchronous Digital Hierarchy. SONET is the United States version of the standard published by the American National Standards Institute (ANSI). SDH is the international version of the standard published by the International Telecommunications Union (ITU). As used herein, the SONET/SDH concepts are more fully detailed in various ANSI and ITU standards, including but not limited to the discussion of concatenated payloads, ITU-T G.707 2000, T1.105-2001 (draft), and T1.105.02-1995.

SONET/SDH may employ virtually concatenated payloads. The virtual concatenation payload support for a SONET/SDH network requires compensation for differential delay among members of the same group. Differential delay results from the payload, which is divided into groups, taking different paths through the network, or due to pointer processing, or other considerations. Data generated at the same time from the source node (with the same MFI, multi-frame indication) in the same group may arrive at the destination node at different times. Further, if the network provides LCAS (Link Capacity Adjustment Scheme) support, new payload members may be added or existing members may be removed, again varying the set of arrival times. Data from different members are typically stored in memory upon arrival at the destination node. Differential delay compensation essentially enables processing all virtual concatenation payload groups at the destination node at one time. In other words, the destination node reads all data from members having the same MFI at one time.

The write address of each member in a virtual concatenation scheme comprises a multi-function indicator (MFI) value in addition to the current data byte and position in the frame for the byte as it is received at the destination node. Each STS-1 frame includes 765 payload bytes, while each STS-3c frame includes 2349 bytes. The destination node may add stuff bytes, or "don't care" data, to the STS-1 payload and may divide STS-3 payload into three parts so that a common format may be used in either case.

The system reads data bytes from different members with the same address (i.e., at the same position in the frame and multi-frame structure) at the same time. Multiple groups are available with data bytes in various positions, and the destination node can only read data bytes at a particular position if all members have received data bytes at a given position, or the destination node has written the corresponding address/position for all members. The difficulty in a multiple group arrangement is quickly and efficiently determining the read address (RA) when data read and write positions can vary at any given time.

A design enabling rapid and efficient determination of read address in the foregoing situation would be highly beneficial, and may provide enhanced processing capabilities and other advantageous qualities over previously known designs, including designs employing the SONET/SDH architecture.

DESCRIPTION OF THE DRAWINGS

The present invention is illustrated by way of example, and not by way of limitation, in the figures of the accompanying drawings in which.

DETAILED DESCRIPTION OF THE INVENTION

The present design may allow for determining the RA for multiple groups receiving virtually concatenated data, including the read address for multiple groups of data. The design may include periodically updating the minimum write address and subsequently computing the read address. The present discussion is divided into three sections, namely a first section describing general system construction, a second section detailing processing using read addresses and write addresses and the connection between data and read addresses and write addresses, and third embodiments showing the acquisition of read addresses according to the present design.

In general, SONET/SDH defines optical carrier levels and electrically equivalent synchronous transport signals (STSs) for the fiber-optic based hierarchy. In SONET, any type of service, ranging from voice to high speed data and video, can be accepted by various types of service adapters. A service adapter maps the signal into the payload envelope of the STS-1. All inputs received are eventually converted to a base format of a synchronous STS-1 signal at 51.84 Mbps or higher. Several synchronous STS-1s may then be multiplexed together in either a single or two stage process to form an electrical STS-n signal, where n is one or more.

SONET uses a basic transmission rate of STS-1, equivalent to 51.84 Mbps. Higher level signals are integer multiples of the base rate. For example, STS-3 is three times the rate of STS-1, i.e. three times 51.84 or 155.52 Mbps, while an STS-12 rate would be twelve times 51.84 or 622.08 Mbps. The SONET architecture employs frames, where the frame is generally divided into two main areas: transport overhead and the synchronous payload envelope, or SPE. The SPE comprises two components, namely STS path overhead and payload. The payload is the traffic being transported and routed over the SONET network. Once the payload is multiplexed into the SPE, the payload can be transported and switched through SONET without having the need to be examined and possibly demultiplexed at intermediate nodes.

The SONET/SDH architecture supports Virtually Concatenated Payloads. Virtual concatenation enables dividing payloads to improve partitioning of SONET/SDH bandwidth and more efficiently carry traffic. Virtual concatenation employs the base SONET/SDH payloads and groups these payloads together to create a larger, size appropriate aggregate payload based on the STS and SPE employed. Virtual concatenation thus enables variation of the payload capacity and allows payload sizes matching client service data rate. This sizing enhancement allows a larger number of channels to be mapped into the SONET/SDH signal.

System Design

Figure 1A:
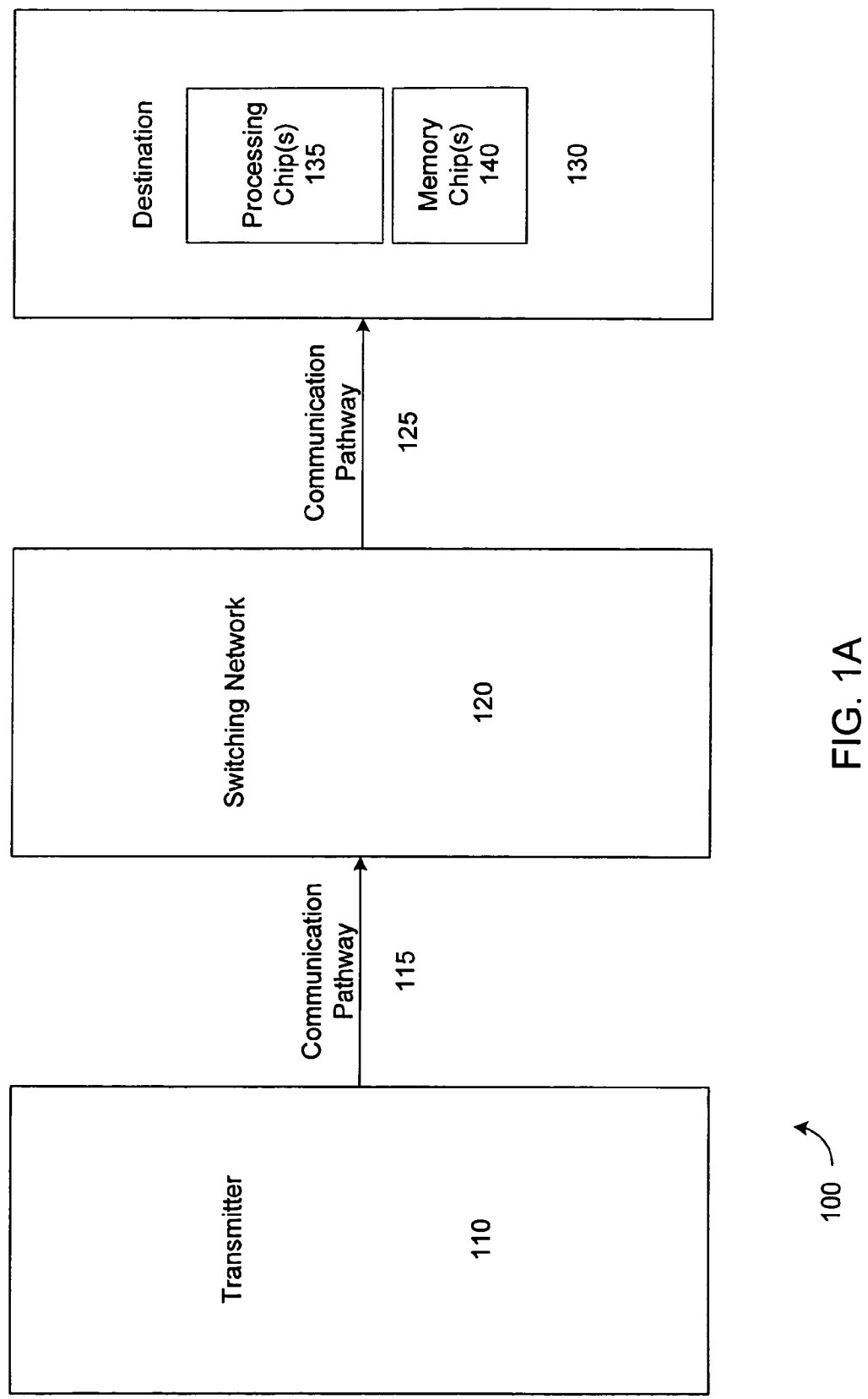
FIG. 1A is a conceptual illustration of a SONET/SDH communications switching system employing the design provided herein.

A typical SONET/SDH switching system 100 is shown in FIG. 1A. In the SONET/SDH switching system 100, a transmitter 110 is connected through a communication pathway 115 to a switching network 120. Switching network 120 is connected through a communication pathway 125 to a destination 130. The transmitter 110 sends data as a series of payloads/frames to the destination 130 through the switching network 120. In the switching network 120, packets typically pass through a series of hardware and/or software components, such as servers. As each payload arrives at a hardware and/or software component, the component may store the payload briefly before transmitting the payload to the next component. The payloads proceed individually through the network until they arrive at the destination 130. The destination 130 may contain one or more processing chips 135 and/or one or more memory chips 140.

Figure 1B:
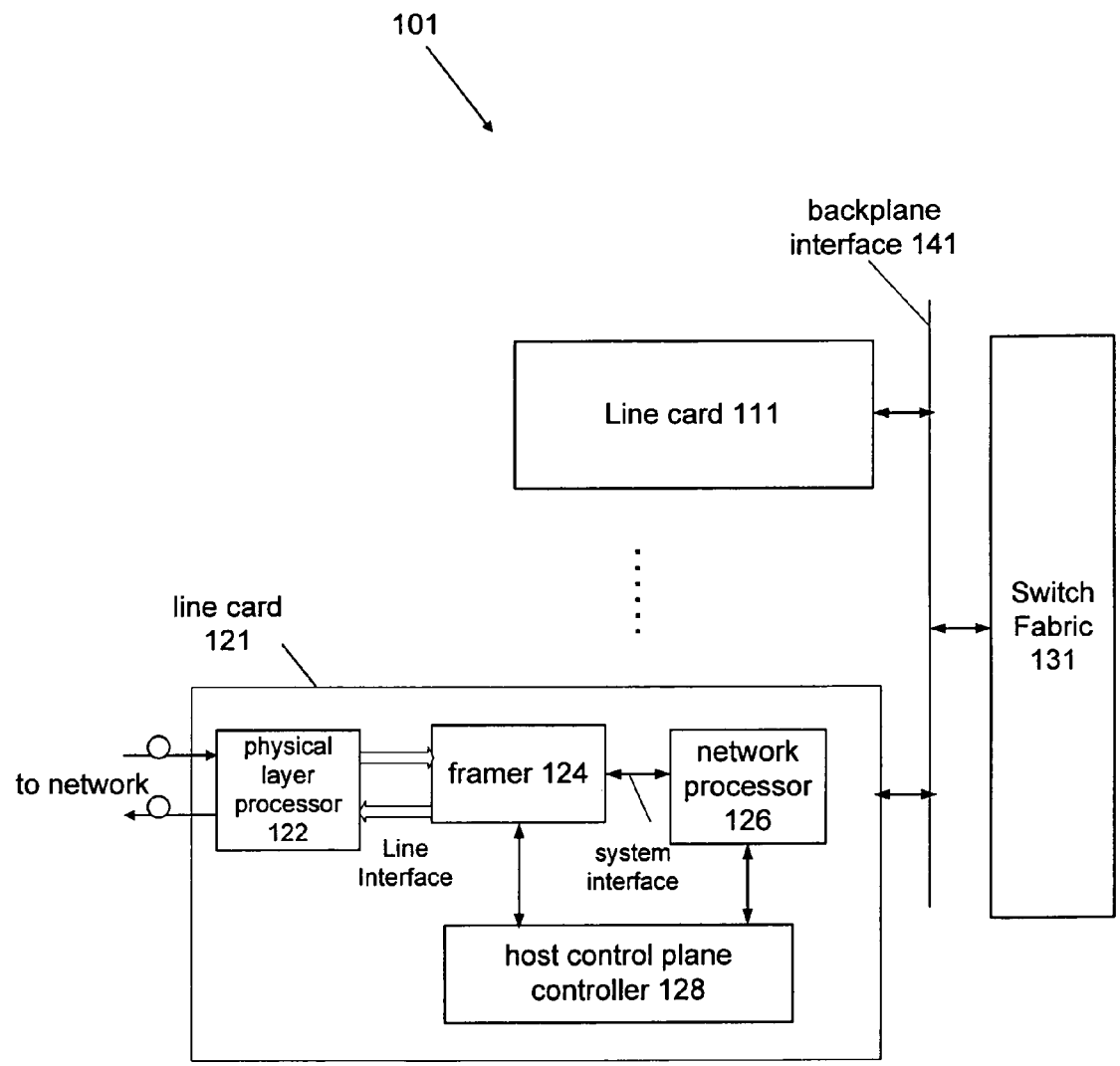
FIG. 1B shows a suitable system embodiment in accordance with an embodiment of the present invention.

FIG. 1B depicts a suitable system embodiment in accordance with an embodiment of the present invention. System 101 may include line card 111, line card 121, system fabric 131, and backplane interface 141. Line card 111 may be implemented as a SONET/SDH add-drop multiplexer, a Fibre Channel compatible line input, an Ethernet line input or a SONET/SDH line input.

Line card 121 may be implemented as a transceiver capable of transmitting and receiving frames and/or packets to and from a network that is compatible with SONET/SDH as well as other protocols such as OTN, TFI-5, and Ethernet, although other standards may be used. For example, SONET/SDH and OTN are described for example in: ITU-T Recommendation G.709 Interfaces for the optical transport network (OTN) (2001); ANSI T1.105, Synchronous Optical Network (SONET) Basic Description Including Multiplex Structures, Rates, and Formats; Bellcore Generic Requirements, GR-253-CORE, Synchronous Optical Network (SONET) Transport Systems: Common Generic Criteria (A Module of TSGR, FR-440), Issue 1, December 1994; ITU Recommendation G.872, Architecture of Optical Transport Networks, 1999; ITU Recommendation G.825, "Control of Jitter and Wander within Digital Networks Based on SDH" March, 1993; ITU Recommendation G.957, "Optical Interfaces for Equipment and Systems Relating to SDH", July, 1995; ITU Recommendation G.958, Digital Line Systems based on SDH for use on Optical Fibre Cables, November, 1994; and/or ITU-T Recommendation G.707, Network Node Interface for the Synchronous Digital Hierarchy (SDH) (1996). For example, an implementation of TFI-5 is described in TFI-5: TDM Fabric to Framer Interface Implementation Agreement (2003) available from the Optical Internetworking Forum (OIF). For example, IEEE 802.3 describes Ethernet standards.

For example, the network may be any network such as the Internet, an intranet, a local area network (LAN), storage area network (SAN), a wide area network (WAN). One implementation of line card 121 may include physical layer processor 122, framer 124, network processor 126, and host-control plane controller 128.

Physical layer processor 122 may receive optical or electrical signals from the network and prepare the signals for processing by downstream elements such as framer 124. For example, for frames and/or packets received from the network, physical layer processor 122 may convert an optical signal to electrical format and/or remove jitter from signals from the network. For frames and/or packets to be transmitted to the network, physical layer processor 122 may remove jitter from signals provided by upstream devices such as framer 124 and prepare signals for transmission to the network, which may be optical or electrical format. Framer 124 may utilize embodiments of the present invention to construct frames and/or packets for transmission to a network in formats such as Ethernet, SONET/SDH, and/or OTN (although other formats may be used).

For frames and/or packets received from a network, framer 124 may utilize embodiments of the present invention to process such frames and/or packets. Framer 124 may transfer overhead from frames and/or packets to a higher layer level processor such as a network processor 126. For example, framer 124 and network processor 126 may intercommunicate using an interface compatible for example with SPI-4 (described for example in the Optical Internetworking Forum (OIF Document) OIF-SPI4-02.1 and ITU-T G.707 2000, T1.105-2001 (draft), T1.105.02-1995, and ITU-T recommendations G.7042 and G.707), although interfaces compatible with other standards may be used.

Network processor 126 may perform layer 2 or layer 3 (as well as other higher layer level) processing on frames and/or packets provided by and to framer 124 in conformance with applicable link, network, transport and application protocols. Network processor 126 also may perform traffic management at the IP layer.

Host-control plane controller 128 may configure operation of framer 124 and network processor 126. For example, host-control plane controller 128 may program/provision framer 124 to control the content of frames. Host-control plane controller 128 could be implemented as separate from network processor 126 and communicate with the framer 124 and network processor 126 using an interface that complies with Peripheral Component Interconnect (PCI) Local Bus Specification, Revision 2.2, Dec. 18, 1998 available from the PCI Special Interest Group, Portland, Oreg., U.S.A. (as well as revisions thereof) or PCI-X Specification Rev. 1.0a, Jul. 24, 2000, available from the aforesaid PCI Special Interest Group, Portland, Oreg., U.S.A., although other standards may be used. Host-control plane controller 128 could be implemented as part of network processor 126, although other implementations may be used.

In one implementation, components of line card 121 may be implemented among the same integrated circuit. In another implementation, components of line card 121 may be implemented among several integrated circuits that intercommunicate using, for example, a bus or conductive leads of a printed circuit board.

Backplane interfaces 131 may be implemented as a single or multi-pin interface and may be used by line cards to interface with system fabric 141. For example, backplane interfaces 131 may be compatible with TFI-5 or CSIX (described in CSIX-L1: Common Switch Interface Specification-L1 (2000)), although other standards may be used. System fabric 141 may transfer IP packets or Ethernet packets (as well as other information) between line cards based on relevant address and header information. System fabric 141 can be implemented as a packet switch fabric or a TDM cross connect. System fabric 141 can be any device (or devices) that interconnect numerous dataplanes of subsystems (i.e. linecards) together.

Virtual Concatenation

In virtual concatenation, each SPE within a concatenated group representing the data frame for transmission contains an identifier, called a Multi-Frame Identifier, or MFI. The MFI forms part of the SONET/SDH path overhead information in the SPE and indicates the SPE's sequence and position within the group. As may be appreciated, the ability to identify the individual payloads by the MFI provides the ability for the system to split the payloads into various sizes or configurations, as long as the MFI is provided with each payload.

Virtual concatenation does not require intermediate node support, so the source 110 and the destination 130 for the network are the only specialized hardware required. The destination 130 reassembles the SPEs in the correct order to recover the data. To compensate for different arrival times of the received data, a phenomenon known as differential delay, the receiving circuits have typically contained some buffer memory, called a delay compensation alignment buffer, so that the data can be properly realigned.

The transmission rates and capacities of virtually concatenated payloads may vary, and may include, for example, SDH designations VC-3 and VC-4, which have payload capacities of 48.960 Mbit/s and 149.760 Mbit/s, respectively. Again, the VC-3 and VC-4 designations represent the virtual containers where, for example, VC-4 includes 9 rows of 261 columns transmitted in a 125 microsecond interval, and VC-3 is 9 rows of 85 columns transmitted in the 125 microsecond interval.

For each virtual concatenation group, the system reads data bytes from different members having the same address (i.e., at the same position in the frame and multi-frame structure) at the same time. The system reads data bytes at a particular position if all members have received data bytes at the particular position (i.e., the corresponding address for all members have been written). Therefore, the read address lags behind the minimum write address, or the write address of the member having a lowest value. To maximize the compensation range for a given Alignment Buffer size, the system may provide a read indication closely after the minimum write address.

Figure 2:
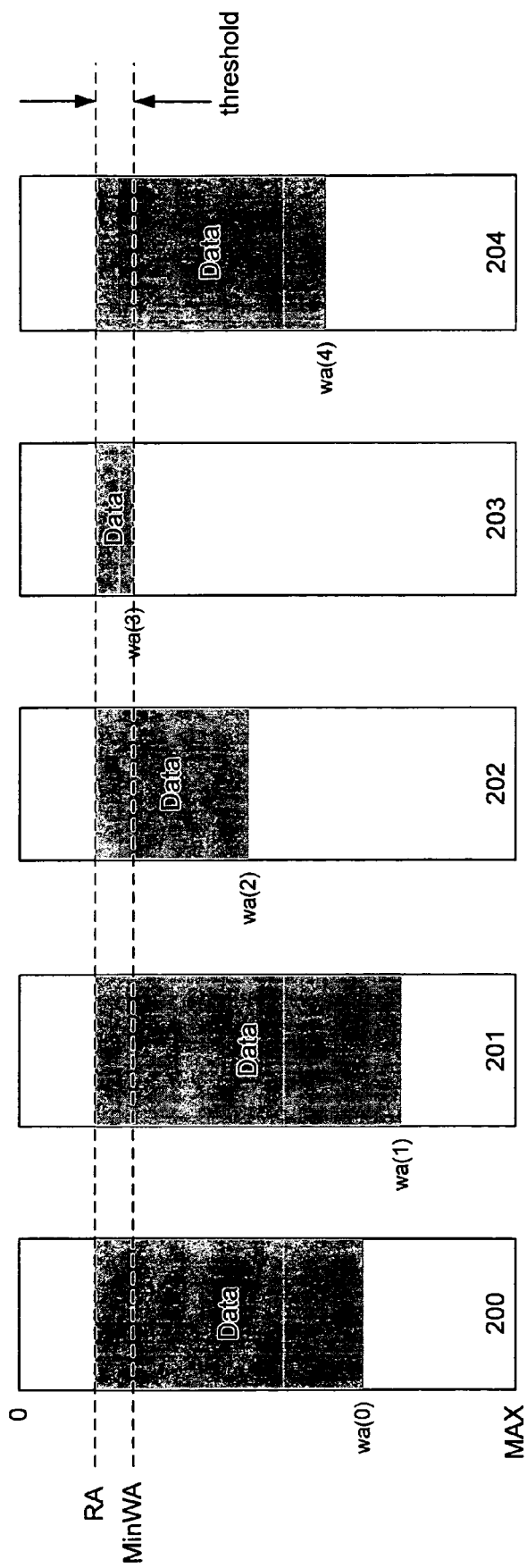
FIG. 2 illustrates performing a determination according to a first condition.

Representative operation of the system is illustrated in FIG. 2. From FIG. 2, five data buffers 200-204 are illustrated. Address 0 is at the top of each buffer, with address MAX at the bottom. Read addresses are uniformly located across the five data buffers 200-204, with minimum write addresses also located across the five data buffers 200-204, separated by a threshold value. Data is written to the end of the existing data, and thus wa(0), wa(1), through wa(4) represent the five write addresses for the presented data configurations.

Figure 3:
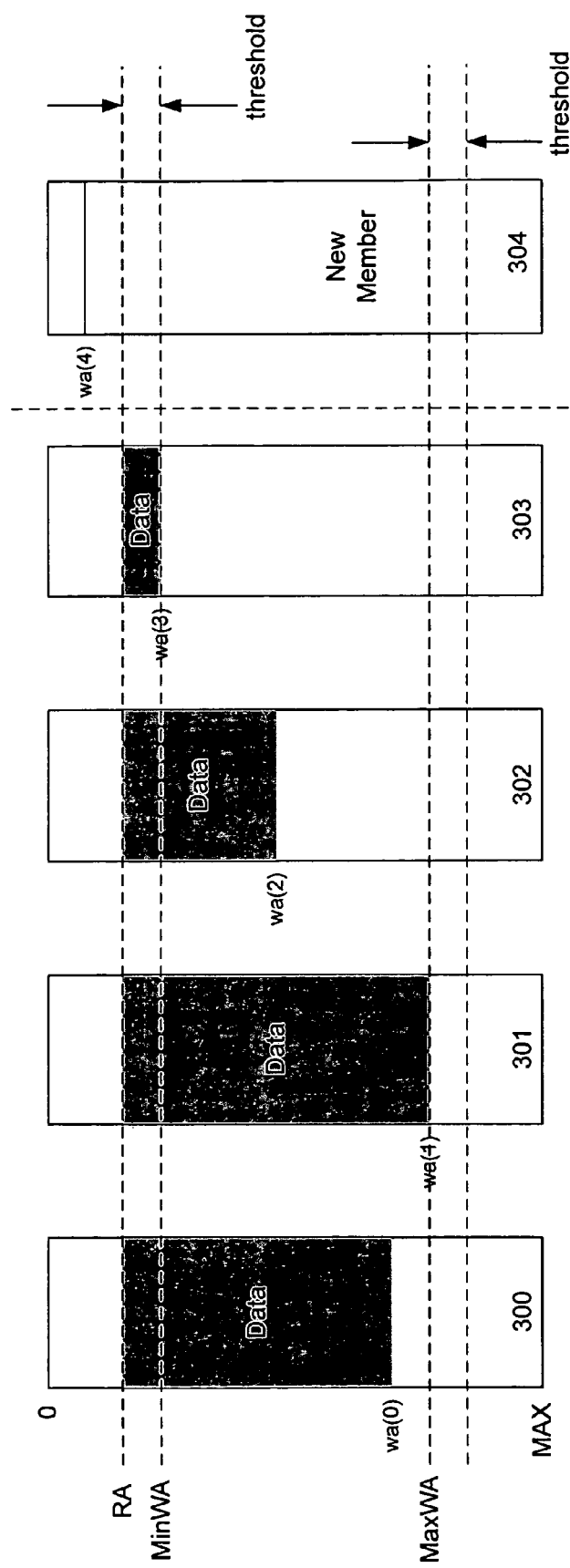
FIG. 3 shows a new member being added having a write address less than the current read address RA.
Figure 4:
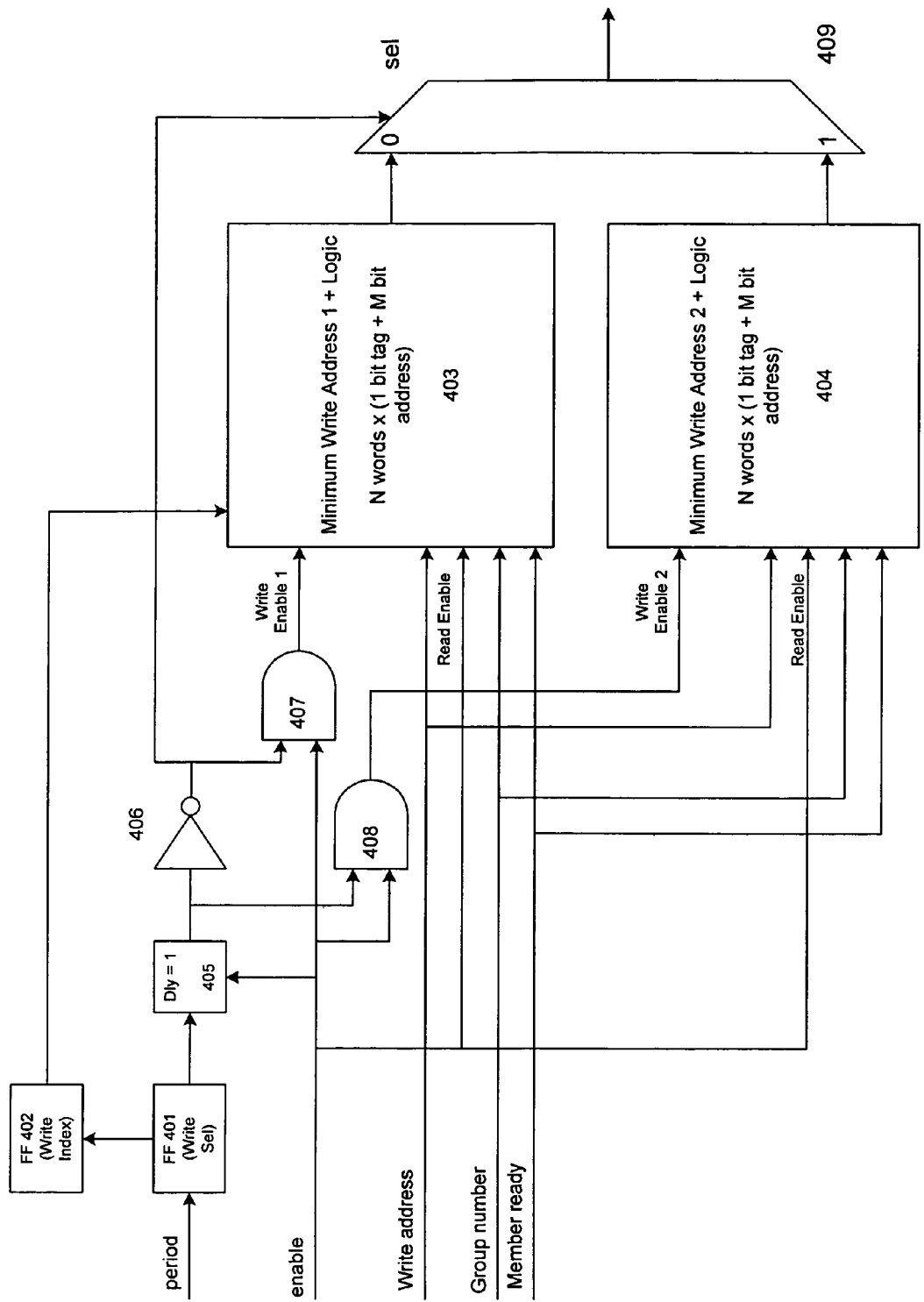
FIG. 4 illustrates one embodiment of logic circuitry usable to determine a minimum write address, including a plurality of memory elements.

LCAS support allows addition or removal of members, and thus more conditions may be encountered. FIG. 3 illustrates the situation where the system adds a new member and the write address is less than the current group read address RA. FIG. 3 shows four memory buffers or alignment buffers 300-304 and a new member 304, again with read address (RA) values, minimum write address (WA) values, and maximum WA values. Write Address wa(4) for new member 304 is closer to zero than the minimum RA. FIG. 4 differs from FIG. 3 by illustrating additional data in the buffers coupled with the new member 404 having data that exceeds the RA and is equivalent to the minimum WA.

Determination of RA

Determining the RA in the foregoing arrangement requires determining the member having a lowest write address value, or the member having the lowest MinWA. Generally, the system can read any address less than the MinWA. Under normal circumstances, the MinWA increments continuously when the destination node 130 receives new data, and the destination node 130 may pause momentarily incoming data contains section overhead bytes or pointer justification. The MinWA value may change when adding new members or removing existing members when the arrangement supports LCAS. The destination node 130 may periodically update the minimum write address.

The destination node 130 may generate minimum write address as follows. Memories store the MinWA for all groups, and if a limited number of groups are employed, the design may employ Flip-Flops (FFs).

Conceptually, the design may address two memories, each containing N words, and each having M+1 bits used. N is equal to the number of groups, such as for example 64 bits, and M is the number of bits in the write address. Each word is associated with a group. Each (M+1)-bit word includes a one bit tag and M bits of the minimum write address for the group corresponding to the word. Two memories are employed so that one memory can be updated while the other is kept constant and available for generating RAs. The destination node 130 can determine minimum write address after comparing write addresses of all members in the same group. In this example, 192 members may belong to up to 64 groups. Assuming that for each clock cycle, the write address of a different member is available, the destination node 130 must evaluate all members in the sequence of 192 clock cycles before determining the value of the MinWA for all 64 groups. During each 192 clock cycle period, the destination node 130 updates one of the two memories while the destination node maintains the other memory in a fixed state and reads the other memory. The implementation is shown in FIG. 4, where the period signal is valid once every 192 clock cycles and represents a 192-clock-cycle period.

From FIG. 4, first flip-flop 401 is the Write Select flip-flop, and the destination node 130 increments this first flip-flop 401 once every 192 clock cycles, or when the aforementioned period signal is high. The value of first flip-flop 401 determines which memory of Minimum Write Address 1 memory 403 or Minimum Write Address Memory 2 404 the destination node 130 may use. When write select is 0, the system selects Minimum Write Address 1 memory 403 for writing. When write select is 1, the system selects Minimum Write Address 2 memory 404 for writing. Second flip-flop 402 assesses whether a group is accessed for a first time during a 192 clock cycle period, using the tag bits in memory. The system increments second flip-flop 402 when first flip flop 401 changes from 1 to 0.

First flip flop 102 is connected to delay block 405, connected in turn to inverter 406 and AND gate 407. AND gate 408 receives an enable signal and output from the inverter 406. Each memory, specifically Minimum Write Address 1 memory 403 or Minimum Write Address Memory 2 404, are N bits by M+1, representing the M bit address and a one bit tag. Each memory feeds into MUX 409, which also receives a select signal from inverter 406.

With the enable signal, the system can process members when the write addresses of different members are not consecutively available. One write address may be available every four clock cycles, and each period then includes 768 clock cycles. The design employs a "member ready" signal in order to have the ability to exclude a time slot from comparison if the time slot is not included in any group.

Figure 5:
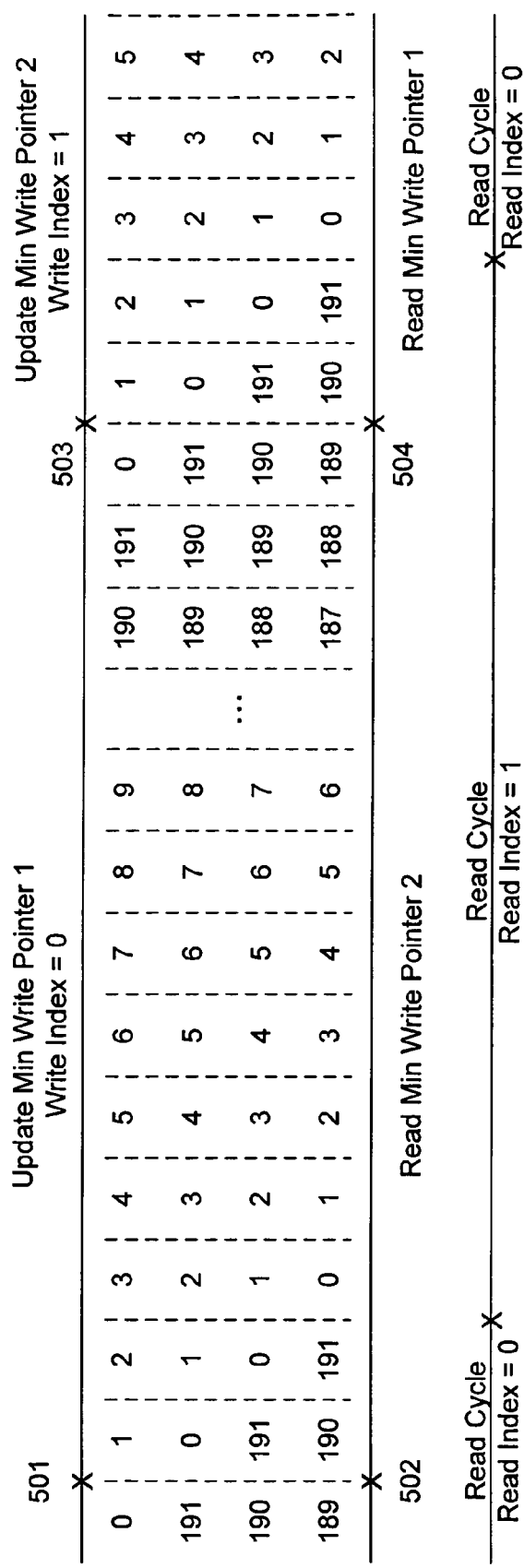
FIG. 5 is a timing diagram showing write slot and read slot contents as processed in a circular type manner for all elements of the data received.

The Minimum Write Address memory is processed as shown in FIG. 5. From FIG. 5, the system updates at period pulses 501, 502, 503, and 504. Time progresses from left to right in FIG. 5, and the "write slot," namely the top row of slots in FIG. 5, represents the slot number for which the data is being written into the delay compensation alignment buffer. The "minimum write pointer update," or second row of slots in FIG. 5, represents the slot number being processed for the minimum write pointer calculation. The "calculate read pointer," or third row of slots in FIG. 5, represents the slot number when the read pointer is generated. The "read slot," shown by the fourth or bottom most row of slots, represents the slot number being read from the delay compensation alignment buffer. The slot for which the minimum write pointer is updated begins at 0 and progresses up to slot 191, associated with one of the two memories available, called here the "write" memory. In this arrangement, the timing is such that the system updates the minimum write address in a first memory with Write Index equal to zero, and updates the minimum write address in a second memory when Write Index is equal to one. Thus, the "write" memory is the first memory when Write Index equal to zero, and the "write" memory is the second memory when Write Index is equal to one. The minimum write pointer is updated once every 192 cycles. The destination node 103 calculates the read pointer using the minimum write address from the "read" memory, namely that memory that is not the "write" memory, given the current value of Write Index. In this manner, the destination node continuously updates the minimum write address without interruption to the read address generation.

In operation, when the destination node 130 receives the group number and write address for a set of data, the system reads the contents of the Minimum Write Address memory, namely either Minimum Write Address 1 memory 403 or Minimum Write Address Memory 2 404, depending on the Write Index value, for that group. If the "member ready" signal is equal to 0, the time slot is not yet part of any group. No further comparison is needed, and the system writes the minimum write address to the memory without modification. If "member ready" is equal to 1, indicating this time slot is part of a group, the system acts as follows. If the tag bit for the group differs from the value in the second flip-flop 402, then the group is being accessed for the first time during the 192 clock cycle period. The system updates the tag bit using the second flip-flop 402 and writes the incoming write address into one of the two memories. If, however, the tag bit is the same as the content of the second flip-flop 402, then this group has already been accessed during this 192 clock cycle period. The system in this case employs delay block 405 to delay the incoming write address by one clock cycle. The system compares the incoming write address with the address from memory. In the implementation shown, the system writes the smaller value of the address stored in memory and the incoming write address to memory with the tag value. After 192 clock cycles, the system updates the minimum write addresses for all groups in this memory. The Minimum Write Address memory not being updated with the incoming write address arrangement described above is read from, and the value read is used to calculate the read address for the corresponding group.

Once the Minimum Write address is computed, the system computes the Read Address. The Read Address block has a memory of N words by M+2 bits to store the read address, with one word for each group. The (M+2)-bit word of the Read Address memory includes one tag bit, one validity bit, and M bits for the read address. The tag bit offers a similar functionality to the tag bit in the Minimum Write Address memories 404 and 403. The validity bit indicates availability of data for reading purposes for the corresponding group during the 192 clock cycle period. When the read address "catches up" with the write address, either because of the continuous reading process (the writing process may stop as described above) or due to the addition of a new member, the destination node 130 may set the validity bit to 0. The system may then stop reading all members belonging to the group being received for one clock cycle. The resultant read address of each group is the current read address of all members belonging to the corresponding group.

Figure 6:
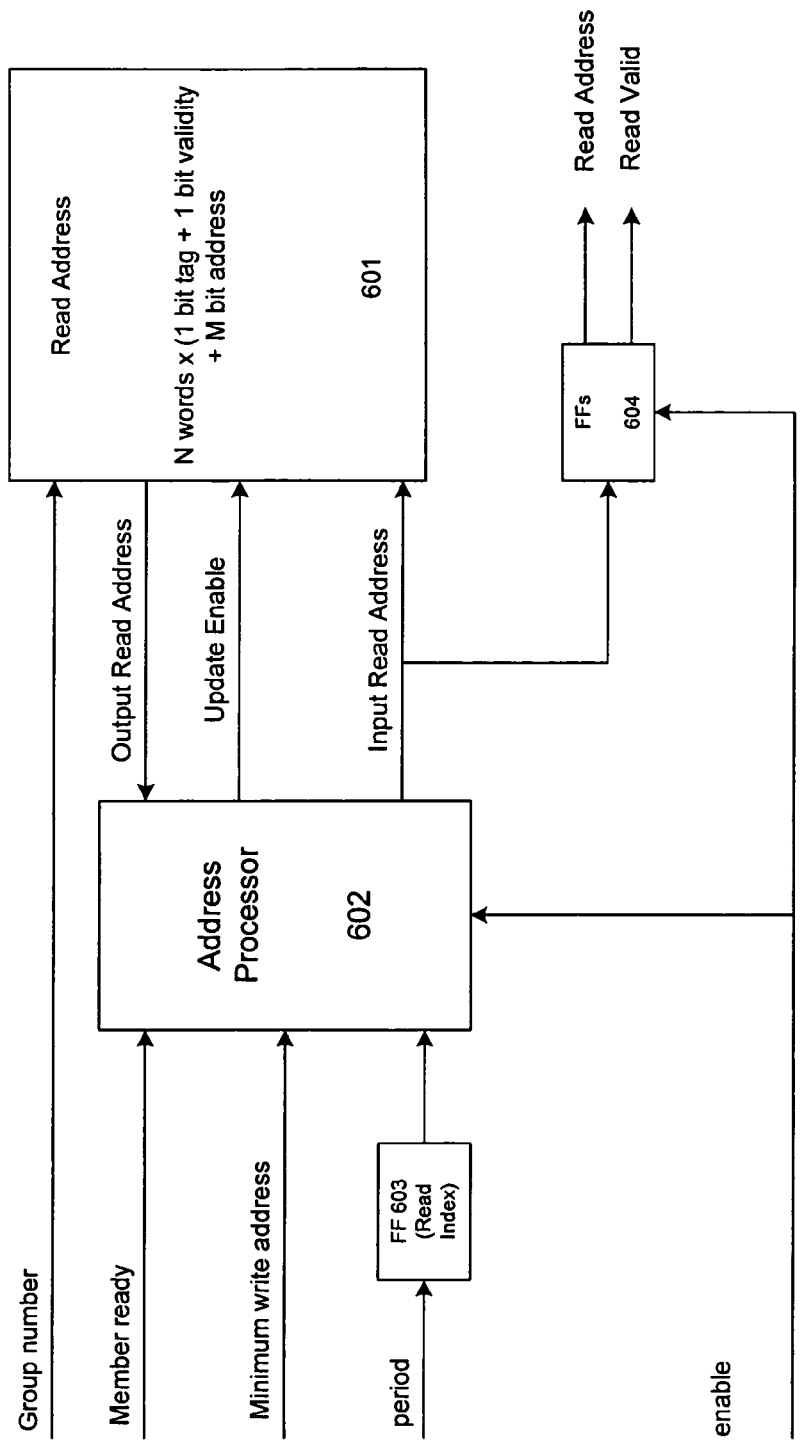
FIG. 6 shows one embodiment of logic circuitry usable to determine a read address based on the minimum write address and other factors.

FIG. 6 illustrates the implementation of the present design, including Read Address memory 601, address processor 602, flip-flop 603, and flip-flops 604. Information provided includes group number, "member ready" indication, minimum write address, period, and an enable signal.

In the beginning of the operation, the system resets the read address for each group to be equal to the minimum write address of the same group minus a threshold. The threshold accounts for the delay in the delay compensation alignment buffer memory. The threshold represents the maximum delay compensation range for the given memory size.

When the incoming "member ready" signal is 0, the corresponding member does not belong to any group. The system modifies the read address for the group. When "member ready" is 1, the following operation is performed. The time base in address processor 604 is maintained by flip flop 603, which in turn is based on the Read Index. The value of the Read Index toggles the flip flop between 0 and 1 every 192 clock cycles when a period pulse is received as described above. The system obtains the read address for the input group number from the Read Address memory during every clock cycle, as well as the corresponding tag and validity bit for the output read address. The input enable signal has the same functionality as described above.

In this arrangement, if the tag bit is different from the Read Index in flip-flop 603, this group is accessed for the first time during this 192 clock cycle period. The system compares the read address with the input MinWA, establishing (if the difference exceeds a threshold) more data words may be read from this group. If data is available, the system increments the read address in Read Address memory 601 and sets the validity bit to 1, and the incremented read address is the read address for all members in this group for the next 192 clock cycles. If data is not available, the system does not change the read address, and the validity bit is set to 0. In either case, the system sets the update enable value to 1 in the Read Address memory 601, indicating this group was processed for this 192 clock cycle period. This updating procedure may also be employed to stop the read address from incrementing when an added member is delayed. The system updates the tag bit using the value of flip-flop 603. The (M+2)-bit updated value, representing the input read address, may then be written back to the Read Address memory 601. If the tag bit is the same as the value of the value in flip-flop 603, the group has been accessed during this 192 clock cycle period. The content of the Read Address memory 601 is not specifically updated, the input read address is equal to the output read address, and no "write back" is necessary. Update enable is thus set to zero.

In both cases, i.e. when data is available or unavailable, the input RA (including the validity bit) is the calculated read address for the corresponding group. Using this RA, the output data for different members of the same group may be compensated for differential delay and can be further processed.

From the foregoing, the system may initially determine the minimum write address using a dual-memory arrangement where one memory is kept constant and available for generating RAs while the other may be updated. The system computes a minimum write address, where the minimum write address for a group of data is determined by scanning all data in each clock cycle period, such as a 192 clock cycle period. Based on this minimum write address, the system computes a read address by processing data in conjunction with a memory, resulting in a read address value.

It will be appreciated to those of skill in the art that the present design may be applied to other systems that perform data processing, and is not restricted to the communications structures and processes described herein. Further, while specific hardware elements and related structures have been discussed herein, it is to be understood that more or less of each may be employed while still within the scope of the present invention. Accordingly, any and all modifications, variations, or equivalent arrangements which may occur to those skilled in the art, should be considered to be within the scope of the present invention as defined in the appended claims.

What is claimed is:

1. A method for determining a read address in a destination node capable of processing virtually concatenated payload members, the method comprising:
   receiving data at the destination node;
   determining a minimum write address across multiple groups containing data from at least one write address associated with the data received at the destination node; and
   determining the read address based on the minimum write address and previous read addresses associated with the data received at the destination node.

2. The method of claim 1, wherein determining the minimum write address comprises:
   receiving at least one write address associated with data received at the destination node;
   comparing all write addresses received; and
   selecting the lowest write address received.

3. The method of claim 2, wherein said comparing all write addresses received occurs in one of a plurality of memory elements.

4. The method of claim 1, wherein determining the read address comprises:
   receiving the minimum write address;
   receiving the previous read address;
   comparing the read address to the minimum write address for a group of data;
   storing the read address for the group; and
   comparing any subsequent read addresses to the stored read address for the group.

5. The method of claim 4, where the read address represents a group read address, and the group read address represents all members belonging to the group.

6. The method of claim 1, wherein determining the minimum write address comprises manipulating write addresses in one of a plurality of memories.

7. The method of claim 1, said method operable within an LCAS environment.

8. An apparatus for determining a read address in a destination node capable of processing virtually concatenated payload members, comprising:
   a plurality of memory elements, comprising at least a first memory element and a second memory element, wherein data in the first memory element may be maintained in a constant state and read from while data in the second memory element may dynamically change, said plurality of memory elements accessible to determine a minimum write address for data received at the destination node; and
   an address memory element and address memory processor configured to:
   receive the minimum write address;
   determine the read address for data received at the destination node based at least in part on the minimum write address;
   compare the read address to the minimum write address for a group of data;
   store the read address for the group; and
   compare any subsequent read addresses to the stored read address for the group.

9. The apparatus of claim 8, wherein said plurality of memory elements is coupled to logic configured to:
   receive at least one write address associated with data received at the destination node;
   compare all write addresses received; and
   select the lowest write address received.

10. The apparatus of claim 8, where the read address represents a group read address, and the group read address represents all members belonging to the group.

11. The apparatus of claim 8, said apparatus operable within an LCAS environment.

12. A system comprising:
   a physical layer interface;
   a framer comprising:
      a plurality of memory elements, comprising at least a first memory element and a second memory element, wherein data in the first memory element may be maintained in a constant state and read from while data in the second memory element may dynamically change, said plurality of memory elements accessible to determine a minimum write address for data received at the framer; and
      an address memory element and address memory processor configured to receive the minimum write address and determine the read address for the data received at the framer based at least in part on the minimum write address and previous read addresses associated with data received at the framer;
   a network processor; and
   an interface to at least provide intercommunication between the framer and the network processor.

13. The system of claim 12, wherein the interface is compatible with PCI.

14. The system of claim 12, wherein the interface is compatible with PCI-x.

15. The system of claim 12, further comprising a host-control plane controller coupled to the interface.

16. The system of claim 12, wherein the second interface is compatible with PCI.

17. The system of claim 12, wherein the second interface is compatible with PCI-x.

18. The system of claim 12, further comprising a second interface and a system fabric.

19. The system of claim 18, wherein the second interface is compatible with TFI-5.

20. The system of claim 18, wherein the second interface is compatible with CSIX.

21. The system of claim 18, further comprising a line card capable of intercommunicating with the system fabric.

22. The system of claim 21, wherein the line card is capable of providing an interface for a Fibre Channel compatible network.

23. The system of claim 21, wherein the line card is capable of providing an interface for an Ethernet compatible network.

24. The system of claim 21, wherein the line card is capable for performing add-drop multiplexing.

* * * * *